(12) United States Patent
Auerbach et al.

(10) Patent No.: US 7,523,208 B2
(45) Date of Patent: Apr. 21, 2009

(54) MESSAGE FILTERING (75) Inventors: Joshua S Auerbach, Ridgefield, CT (US); Simon Antony Holdsworth, Andover (GB); Neil George Young, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 1473 days.

(21) Appl. No.: 10/017,728

(22) Filed: Dec. 14, 2001

(65) Prior Publication Data
US 2003/0115336 A1    Jun. 19, 2003

(51) Int. Cl.
G06F 15/16    (2006.01)
(52) U.S. Cl. .................................. 709/228; 709/217
(58) Field of Classification Search ......... 709/217–218, 709/245, 228, 246; 705/14; 707/10
See application file for complete search history.

(56) References Cited

U.S. PATENT DOCUMENTS

| | | | | |
|---|---|---|---|---|
| 6,460,036 B1* | 10/2002 | Herz | ............................ | 707/10 |
| 6,516,338 B1* | 2/2003 | Landsman et al. | .......... | 709/203 |
| 6,735,585 B1* | 5/2004 | Black et al. | ..................... | 707/3 |
| 6,826,534 B1* | 11/2004 | Gupta et al. | .................... | 705/1 |
| 6,868,441 B2* | 3/2005 | Greene et al. | .............. | 709/220 |
| 6,918,084 B1* | 7/2005 | Slaughter et al. | ............. | 715/513 |
| 6,922,685 B2* | 7/2005 | Greene et al. | .................. | 707/1 |
| 6,980,999 B1* | 12/2005 | Grana | ...................... | 707/104.1 |
| 6,990,481 B1* | 1/2006 | Coile | ............................. | 707/2 |
| 7,043,526 B1* | 5/2006 | Wolfe | ......................... | 709/203 |
| 7,043,531 B1* | 5/2006 | Seibel et al. | ................ | 709/206 |
| 7,054,900 B1* | 5/2006 | Goldston | .................... | 709/203 |
| 7,082,427 B1* | 7/2006 | Seibel et al. | ................... | 707/4 |
| 7,181,438 B1* | 2/2007 | Szabo | ........................... | 707/2 |
| 7,216,181 B1* | 5/2007 | Jannu et al. | ................. | 709/246 |
| 7,349,945 B1* | 3/2008 | Whipple | ..................... | 709/206 |
| 2002/0040374 A1* | 4/2002 | Kent | .......................... | 707/516 |

* cited by examiner

Primary Examiner—Douglas B Blair
(74) Attorney, Agent, or Firm—A. Bruce Clay, Esq.; Steven M. Greenberg, Esq.; Carey Rodriguez Greenberg & Paul LLP (57) ABSTRACT

The invention relates to a communications manager, method and computer program for receiving publications and forwarding these on to parties who have subscribed to receive such publications. A subscription request of a first type is received and includes a filter expression having at least one attribute. It is possible to map at least part of such an attribute(s) to a generic format (generic format filter attribute(s)). It is also possible to receive a publication message of a second type and to compare the publication received with the subscription request to determine whether the publication is appropriate for forwarding onto the subscriber originating the request. To enable such a comparison, a generic format filter attribute(s) is identified and is mapped to a format corresponding to the second message type. Once a match is found, the publication can then be transmitted to the originating subscriber.

7 Claims, 9 Drawing Sheets

MESSAGE FILTERING

FIELD OF THE INVENTION

The present invention relates to the field of data processing and more specifically to a data processing system which distributes messages from suppliers (publishers) of data messages to consumers (subscribers) of such messages.

BACKGROUND OF THE INVENTION

Publish/subscribe data processing systems have become very popular in recent years as a way of distributing data messages. Publishers are typically not concerned with where their publications are going, and subscribers are typically not interested in where the messages they receive have come from. Instead, a message broker typically assures the integrity of the message source, and manages the distribution of the message according to the valid subscriptions registered in the broker.

Publishers and subscribers may also interact with a network of brokers, each one of which propagates subscriptions and forwards publications to other brokers within the network. Therefore, when the term "broker" is used herein it should be taken as encompassing a single broker or multiple brokers working together as a network to provide brokering services.

Figure 1:
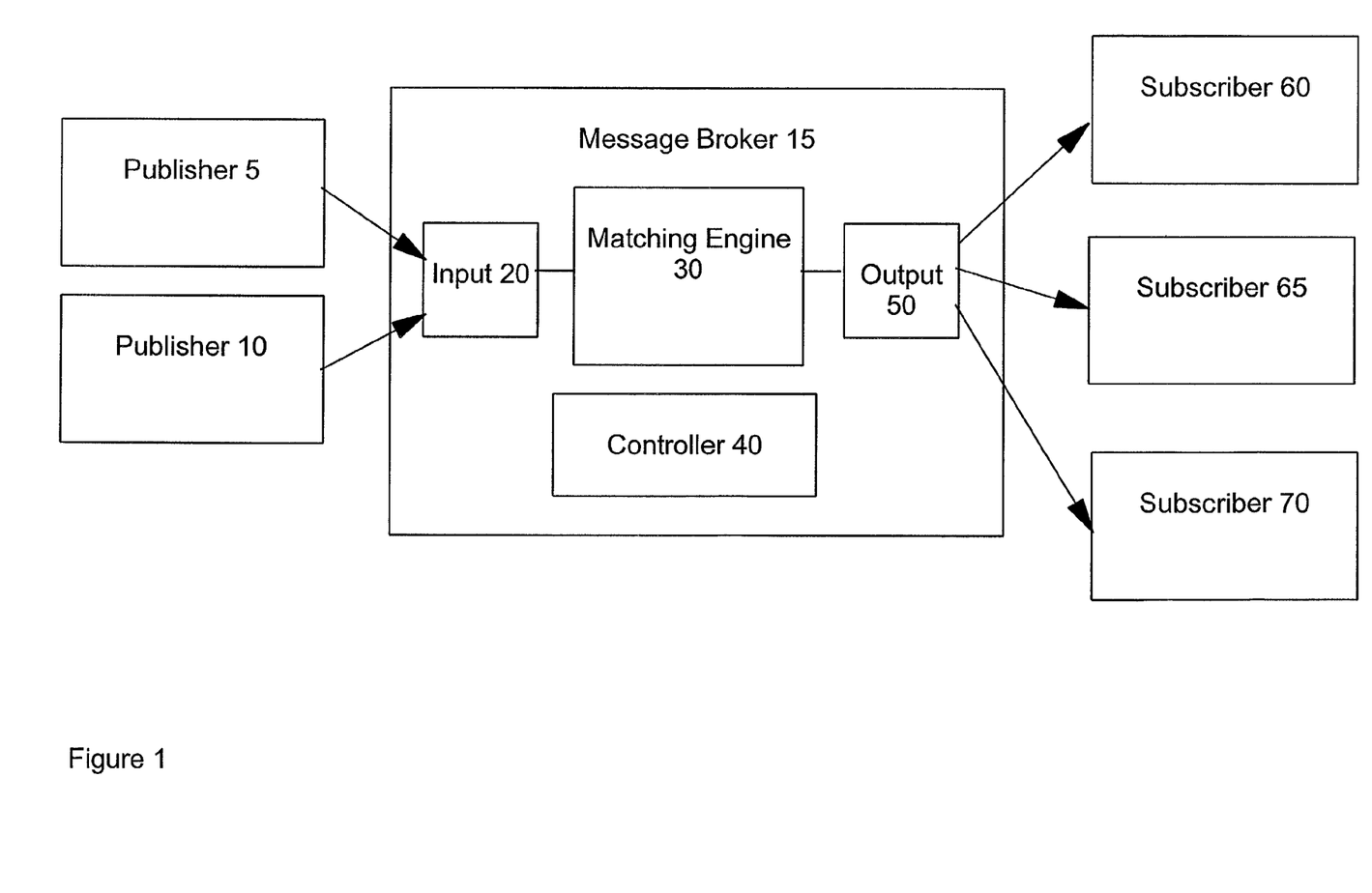
FIG. 1 illustrates a typical publish/subscribe data processing system according to the prior art.

FIG. 1 illustrates a typical publish/subscribe data processing system according to the prior art. A message broker 15 has an input mechanism 20 which may be, for example, an input queue or a synchronous input node by which messages are input when they are sent by a publisher 5; 10 to the message broker. A published message is fetched from the input mechanism by a controller 40 and processed to determine, amongst other things, to which subscribers 60; 65; 70 the message should be sent.

Message topics typically provide the key to the delivery of messages between publishers and subscribers. The broker attempts to match a topic string on a published message with a list of clients who have subscribed to receive publications including that topic string. A matching engine 30 is provided in the message broker for this very purpose. When the subscriber registers, it must typically specify a means by which it wants to receive messages (which may be a queue or other input mechanism) and a definition of the types of messages that it is interested in. A subscriber can specify that it wishes to receive messages including a topic string such as "employee/salary" and any messages matching that topic string will be identified and forwarded on to the subscriber via an output mechanism 50. (Note, there may be more than one input and output mechanism to and from which messages are received and sent by the message broker.)

It will be appreciated however that a subscriber to even a single topic may still receive a wealth of material that they are not actually interested in. It is therefore possible to further narrow the scope of a subscription by requesting only those publications having a specific content via the use of filters. For example, a subscription to the topic "employee/salary" might request only those messages published to that topic where the salary is greater than £30,000.

Figure 2:
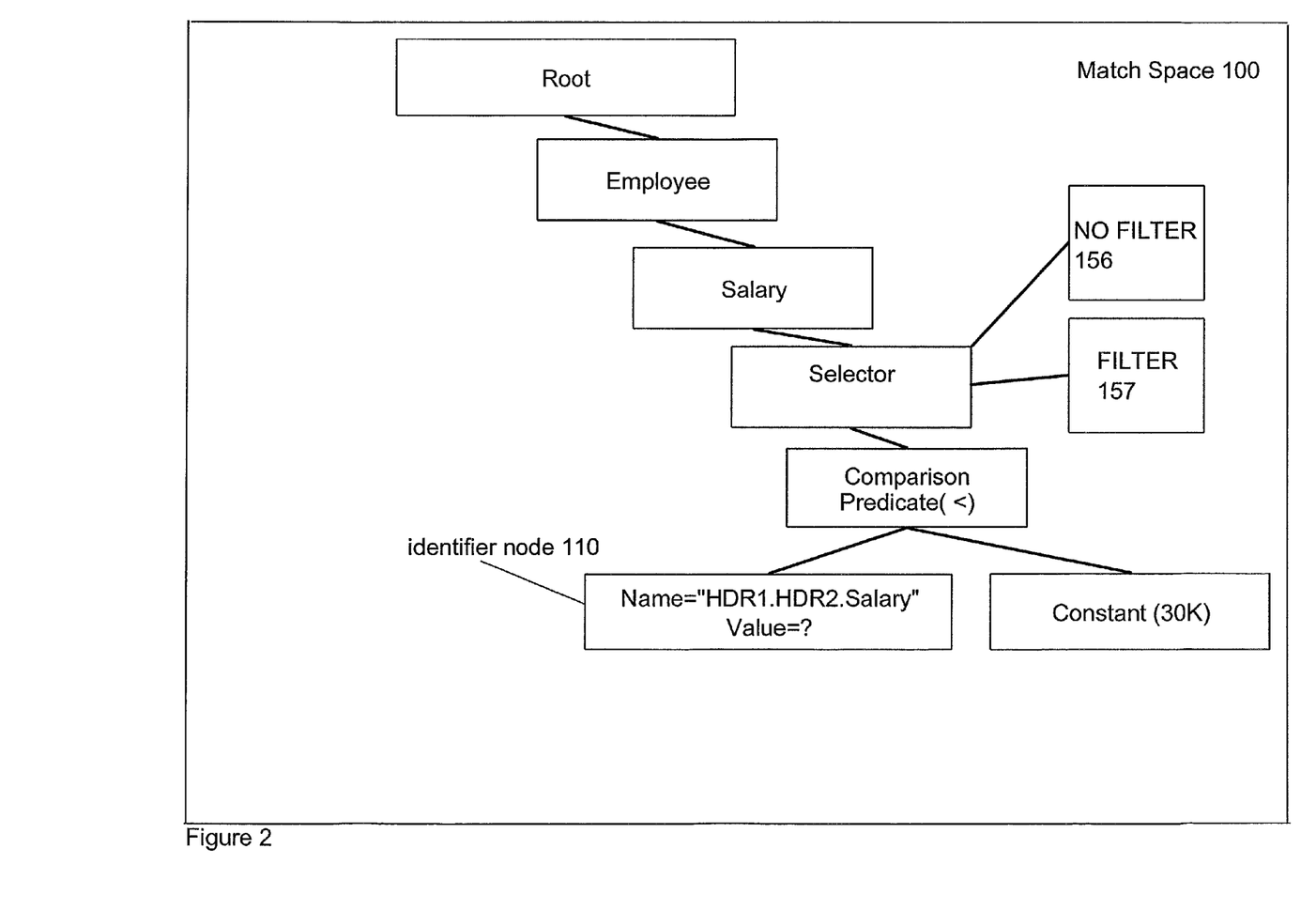
FIG. 2 shows the processing performed at the broker in response to registration by a subscriber in accordance with the prior art.

FIG. 2 shows the processing performed at the broker in response to registration by a subscriber in accordance with the prior art. A subscriber typically sends a message to the broker to register their subscription. This may be of the form topic=employee/salary; filter=salary>30000. This is received at the broker and is interrogated by the matching engine in order to create a parsed representation of the subscription, which can be used to determine whether any publications received at the broker match the needs of the subscriber. The parsed representation is created in a match space 100 within the matching engine and typically consists of a hierarchical tree structure comprising a number of nodes depending either directly or indirectly from a root node. As can be seen from the example topic string given, a topic string may comprise a number of topic levels. Each one is stored as a node in the tree structure, with the first level topic name, employee, depending directly from the root node and each subsequent level depending from the previous level's node. Thus in the example, a salary node depends from the employee node.

Information pertaining to the filter specified is then added into the tree structure. The filter information is typically stored in the match space separately from the main topic tree and takes the form of individual filter sub-trees Pointers then point from the topic tree to the filter sub-trees (multiple topic branches may point to the same sub-tree to aid reusability). FIG. 2, however, shows the complete picture.

In the example given, a comparison needs to be done to determine whether an employee's salary is greater than 30,000. Therefore a "comparison" node depends from the salary node. Dependent upon that is a "salary" identifier node 110 (currently having no value) and a constant node containing the value 30,000.

Identifier nodes contain attributes or properties (e.g. a "salary" attribute) and the value of such an attribute, parsed in temporarily from a publication, is used in determining whether that publication is to be forwarded onto a particular subscriber. In this regard, such a node's name is therefore compared against the fields in a publication message to look for a match. This name will typically include a part uniquely identifying the attribute (e.g. "salary"). The full name of such a node however typically depends upon the type of subscription request received. Subscriptions may arrive at the broker in a variety of different formats according to the messaging protocol used.

Figure 3:
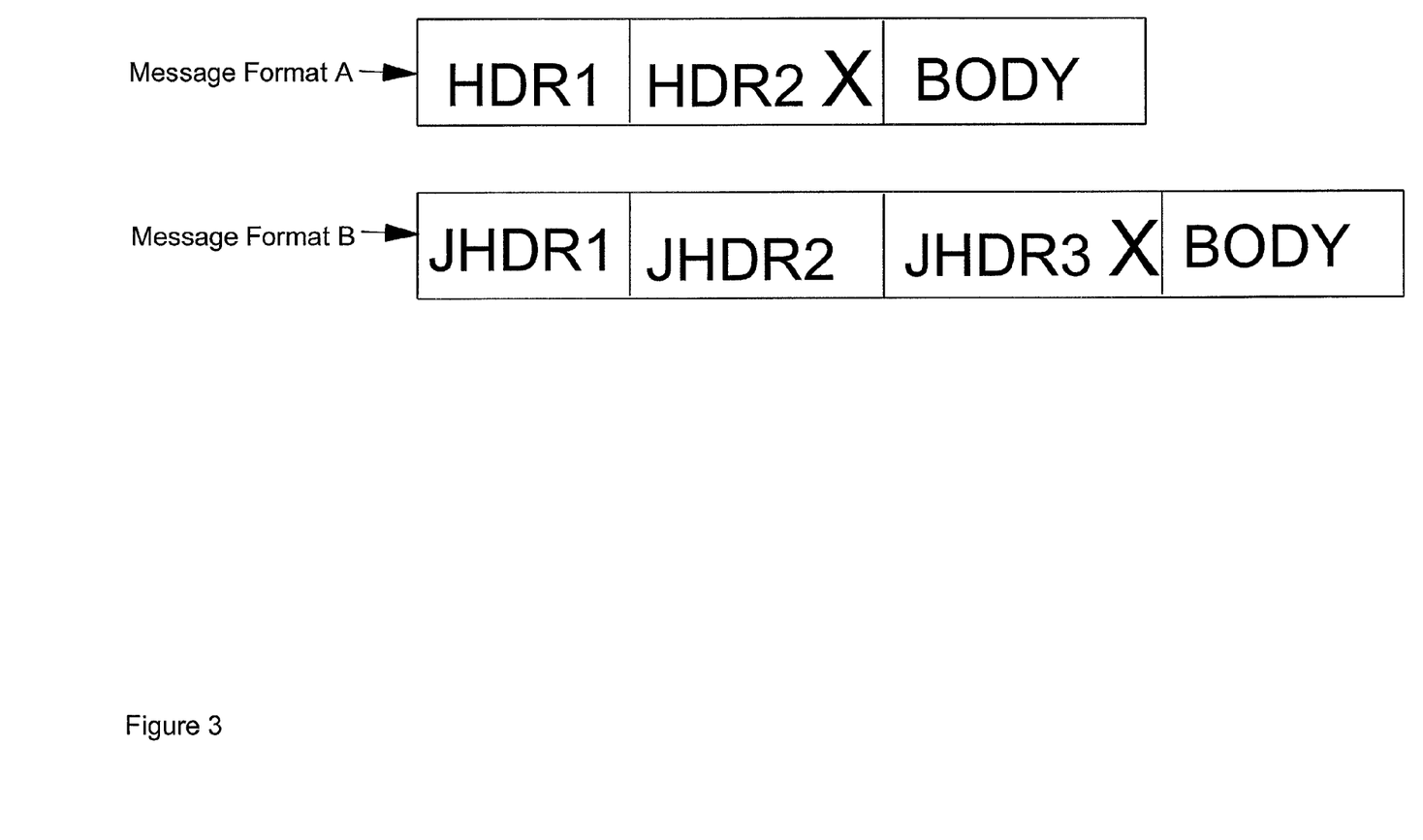
FIG. 3 shows an exemplary highlevel view of two different message formats.

FIG. 3 shows two example message formats A and B. It can be seen that message A has two headers (HDR1; HDR2) and a main body, whilst message B has three headers (JHDR1; JHDR2; JHDR3) and a body. In messages of type A the attribute, X (i.e Salary), sits in the second header. In messages of type B this same attribute sits in the third header. Thus it will be appreciated that the attribute itself typically has a common description, but its location may vary between message formats. The position of the attribute is typically used as a naming protocol for the identifier node. Thus it can be seen from FIG. 2 that the subscription request is of message type A since identifier node 110 has the name HDR1.HDR2.Salary showing that the attribute Salary sits in the second header.

When a publication is received at the message broker it can be parsed against the structure shown in FIG. 2 to determine whether there are any matches. First the topic string in the publication message, is parsed through the tree structure. In this instance an employee node is found, as is a salary node. Identifier node 110 is then detected and the value from the salary data field of the publication message is input to this node and then compared against the constant node. A value of TRUE or FALSE is returned dependent upon whether this particular employee's salary is greater than 30,000. The TRUE or FALSE value is returned to a selector node which sits between the last topic node (salary) and the first filter node (comparison predicate). (Note, there is typically a selector node for each topic branch.) If a value of TRUE is returned the message is forwarded onto any subscribers who have previously specified such a filter to narrow down the scope of messages received. Typically a couple of distribution lists of subscribers are attached to the selector node and correlated with the appropriate sub-tree (each sub-tree is named—e.g. 1) such that the broker knows who to forward messages on to. Of course the distribution lists do not have to be associated with this node, indeed a selector node may not even exist. Instead the lists may, for example, be associated with the salary node (i.e. the last topic node). A table 156 lists those subscribers who have not scoped their messages with a filter, and a table 157 lists those subscribers who have specified a filter. The tables typically list subscribers by subscriber id. It is the appropriate selector node which typically makes the decision as to which subscribers to send a publication onto.

This process all works fine so long as the publication message received at the broker is of the same format as the subscription request stored at the message broker. If the formats differ then the matching engine will not find the salary attribute when doing a comparison between the identifier node 110 (e.g. HDR1.HDR2.X) and a publication message of a different format (e.g. of type B) also including the relevant attribute. This is because the attribute is located differently in the publication messages as compared with the subscription request. Thus in order to achieve a match between the identifier node in the tree structure and a message of type B, the identifier node 110 would have to be named JHDR1.JHDR2.JHDR3.X.

It will thus be appreciated that a message broker is able to cope with publications and subscriptions of the same message format. The broker is currently not however able to forward publication messages on to subscribers who have registered their subscription using a different message format.

To reiterate, this is because such filter attributes are not standard and can therefore be located in any one of a number of different places according to the message format used. Topics on the other hand are typically standard across message formats and thus in a preferred embodiment such a strict naming convention within the tree structure for these is not required to indicate attribute location. A piece of code selected according to the type of message received is able to extract any topic information such that it can be parsed into a tree-like representation within the match space.

DISCLOSURE OF THE INVENTION

Accordingly, a first aspect of the present invention provides a communications manager for receiving publications and forwarding said publications to parties who have subscribed to receive such publications, said communications manager enabling a plurality of different formats of publication to be forwarded to subscribers who have registered their subscriptions using any one of a plurality of different subscription formats.

Accordingly, another aspect of the invention provides a communications manager for receiving publications and forwarding said publications on to parties who have subscribed to receive such publications, said communications manager comprising: means for receiving a subscription request of a first type, said request including a filter expression having a least one attribute; means for mapping at least part of an attribute to a generic format (generic format filter attribute); means for receiving a publication message of a second type; means for comparing the publication received with the subscription request to determine whether the publication is appropriate for forwarding onto the subscriber originating the request, said comparing means comprising: means for identifying a generic format filter attribute; and means for mapping the generic format filter attribute to a format corresponding to the second message type, the communications manager further comprising: means for transmitting said publication to the originating subscriber.

Note, the term "at least part of an attribute" may be taken to encompass, for example, an attribute name. Further, the term "generic format filter attribute" is used herein as a short form for the generic form of at least part of an attribute.

Preferably the communications manager further comprises means for preparing the publication for transmission to the originating subscriber. This is because whilst the communications manager is now able to determine that the publication meets the criteria specified by the subscriber (and should thus be forwarded thereto), the publication is typically in an unusable state. In other words a subscriber is typically unable to read a message in a format different to the one that it used when subscribing. Preferably therefore the publication is prepared, prior to transmission, such that it is readable by the subscriber. Alternatively it is the subscriber who converts the publication to a readable form. This solution is however less satisfactory. The communications manager expects to receive publications and subscription requests in a variety of different formats and it is easier for the manager to predict and thus cater for such formats centrally. It is more difficult for subscribers to predict the types of message that they might receive. Further this implementation requires preparation means on each and every subscriber and this is an inefficient use of resource, and updating each subscriber to cope with additional formats is more costly than updating communications managers.

According to a preferred embodiment, in order to prepare the publication for transmission to the originating subscriber, a substantially empty message of the first type is created. Note the message may include some information standard to the first type, or indeed contain no information at all.

Information is then preferably extracted from the message of the second type and this information is subsequently inputted into the substantially empty message.

According to a preferred embodiment, a first component is invoked which is capable of understanding messages of a first type. This first component maps at least part of the attribute to the afore-metioned generic format. Preferably this generic format filter attribute is stored (e.g. in non-volatile memory). This is such that it can be used with other publication messages received at the communications manager.

Whilst the format corresponding to the first type of message could be stored rather than the generic format, this is not nearly such a satisfactory solution. The mapping relationship required is many to many (i.e. there can be many different formats each corresponding to a different message type stored and many types of publication can be received at the communications manager). Instead a one to many relationship is preferred (e.g. there can be many types of publication received, but only the generic format of part of a subscription request is ever stored).

According to a preferred embodiment, a second component is invoked which is capable of understanding messages of the second type. This second component maps the generic format filter attribute to the format corresponding to the second message type. Note, it would be possible to leave the stored generic format alone and to transform a publication message attribute/attribute part into a generic format, thus enabling the communications manager to do a direct comparison between the stored generic format and the publication message received. However, message transformation is computationally expensive and therefore less satisfactory.

Preferably the format corresponding to the second message type is held in temporary storage until the comparison is complete. Of course the format corresponding to the second message type could be used to overwrite the generic format in non-volatile memory. However this means that the generic format cannot be used subsequently, or concurrently by the matching engine for comparison against a number of messages. Whilst the communications manager will typically only accept one subscription request at a time, this is not the case with regard to receipt of publications thereat. Thus the comparison means may be doing a comparison against multiple publications at any one time.

In an alternative embodiment, a lookup table is used instead. Such a table contains mappings between the generic format of an attribute/attribute part and formats corresponding to different message types. Thus the generic format filter attribute is not converted and the result of this conversion held in temporary storage. Instead a lookup in the table is performed to and then this information retrieved to look for a match in the current publication. Thus the "means for mapping the generic format filter attribute to a format corresponding to the second message type" should be seen as covering such a lookup table embodiment.

According to another aspect, the invention provides a method for receiving publications and forwarding said publications on to parties who have subscribed to receive such publications, said method comprising: receiving a subscription request of a first type, said request including a filter expression having a least one attribute; mapping at least part of an attribute to a generic format (generic format filter attribute); receiving a publication message of a second type; comparing the publication received with the subscription request to determine whether the publication is appropriate for forwarding onto the subscriber originating the request, the step of comparing comprising: identifying a generic format filter attribute; and mapping the generic format filter attribute to a format corresponding to the second message type, the method further comprising: transmitting said publication to the originating subscriber.

According to yet another aspect, the invention provides a computer program comprising program code adapted to perform the method of the preceding paragraph when said program is run on a computer.

BRIEF DESCRIPTION OF THE DRAWINGS

A preferred embodiment of the present invention will now be described, by way of example only, and with reference to the following drawings.

DESCRIPTION OF THE PREFERRED EMBODIMENTS

Figure 4A:
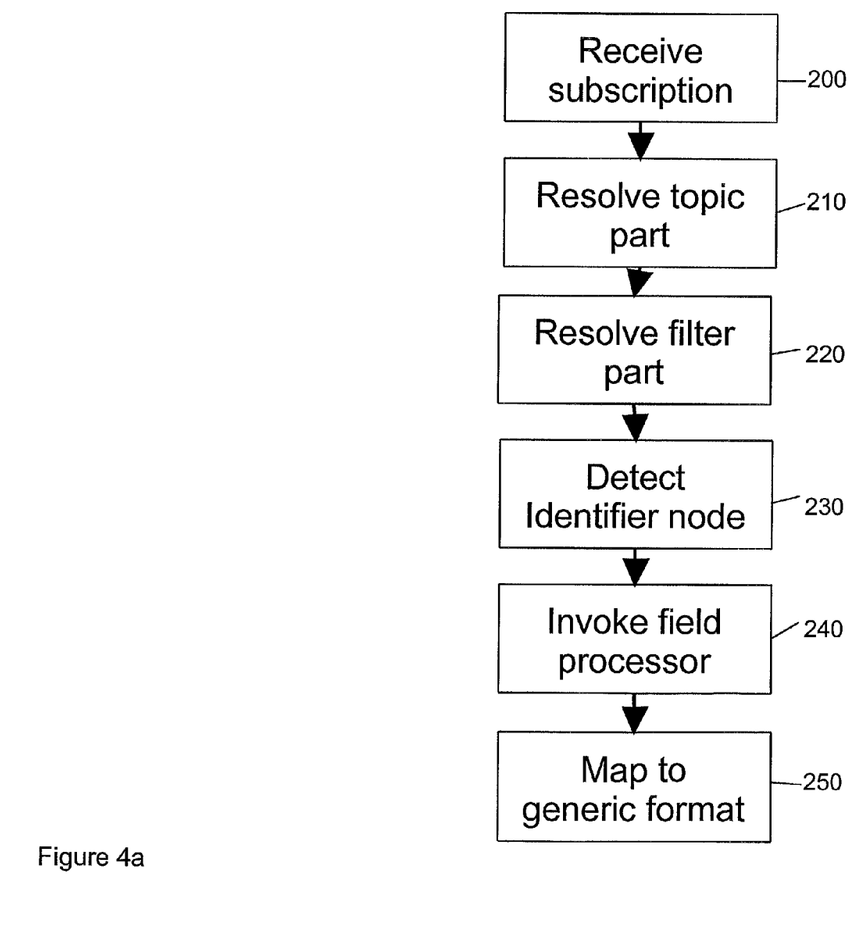
FIGS. 4a and 4b show the processing upon receipt of a subscription at the broker in accordance with a preferred embodiment of the present invention.

With reference to FIG. 4a, a subscription is received at the broker (step 200). By way of example, the subscription request includes topic information "employee/salary" and filter information "filter=salary>30000". (Note, the filter information is described in the preceding sentence from an application user's perspective. From the broker's perspective the filter information looks as follows "HDR1.HDR2.salary>30000".) The topic information contained therein is resolved into a parsed representation (as shown in FIG. 2). The filter part is subsequently partially resolved (step 220) and in doing so the possibility of creating an identifier node from the provided attribute information is detected (step 230).

At this point it is appropriate to mention that in addition to the standard components making up the message broker, a number of "field processor objects" are located in the matching engine. One field processor object exists per message format that the broker purports to be able to understand. Thus for the two message formats identified in FIG. 3, field processor A understands messages of type A and field processor B understands messages of type B. (It will of course be appreciated that a single processor object could cope with more than one type of message format).

Figure 4B:
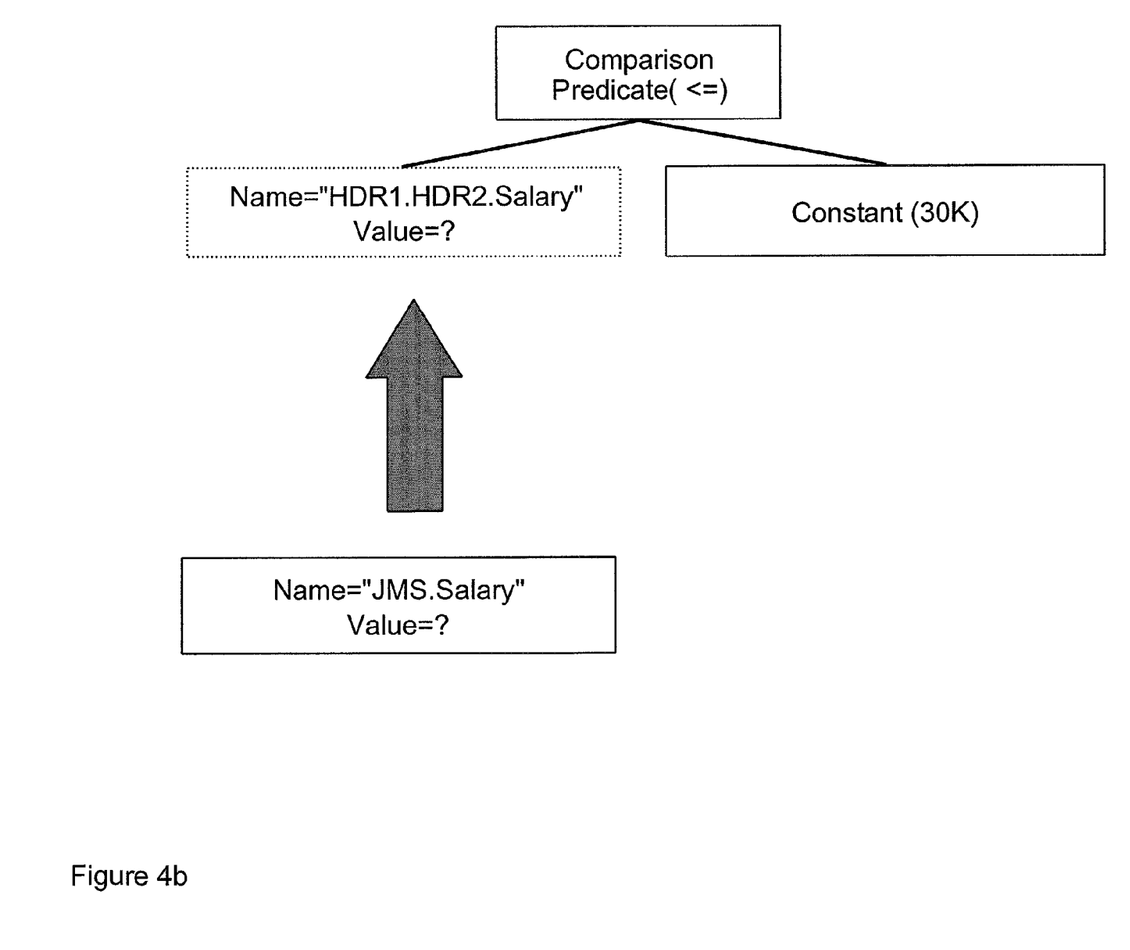

In this example, a subscription request of type A is received. Thus having identified that there is the possibility of creating an identifier node from some of the attribute information provided in the subscription, field processor object A is invoked (step 240) to locate and extract the attribute information. This field processor then, instead of creating an identifier node specific to message format A, creates a generic identifier node and this node takes up its appropriate position in the overall parsed representation (i.e. sits in place of what would have been a specific identifier node). Such a generic node has a part prefacing the attribute and denoting that this is a generic node (e.g. JMS.X). Please see FIG. 4b.

Figure 5A:
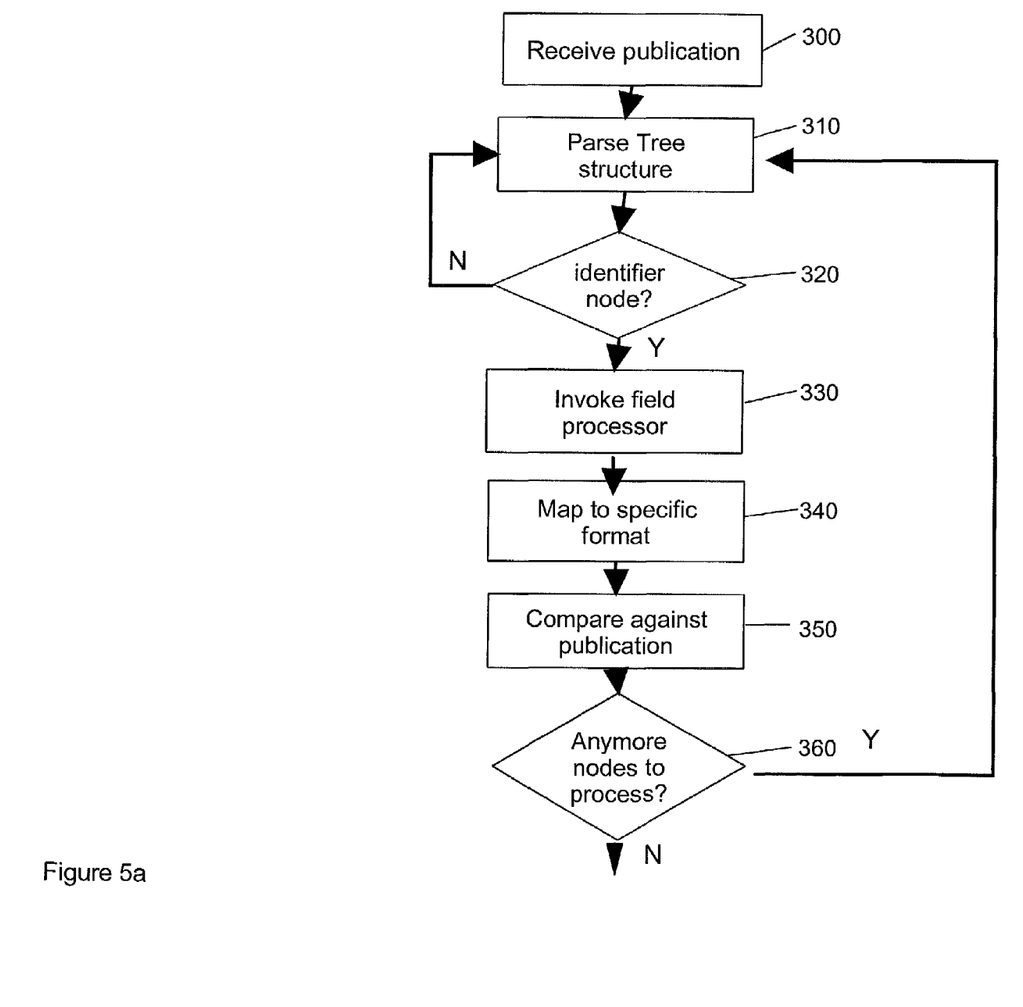
FIGS. 5a and 5b show the processing upon receipt of a publication at the broker in accordance with a preferred embodiment of the present invention.
Figure 5B:
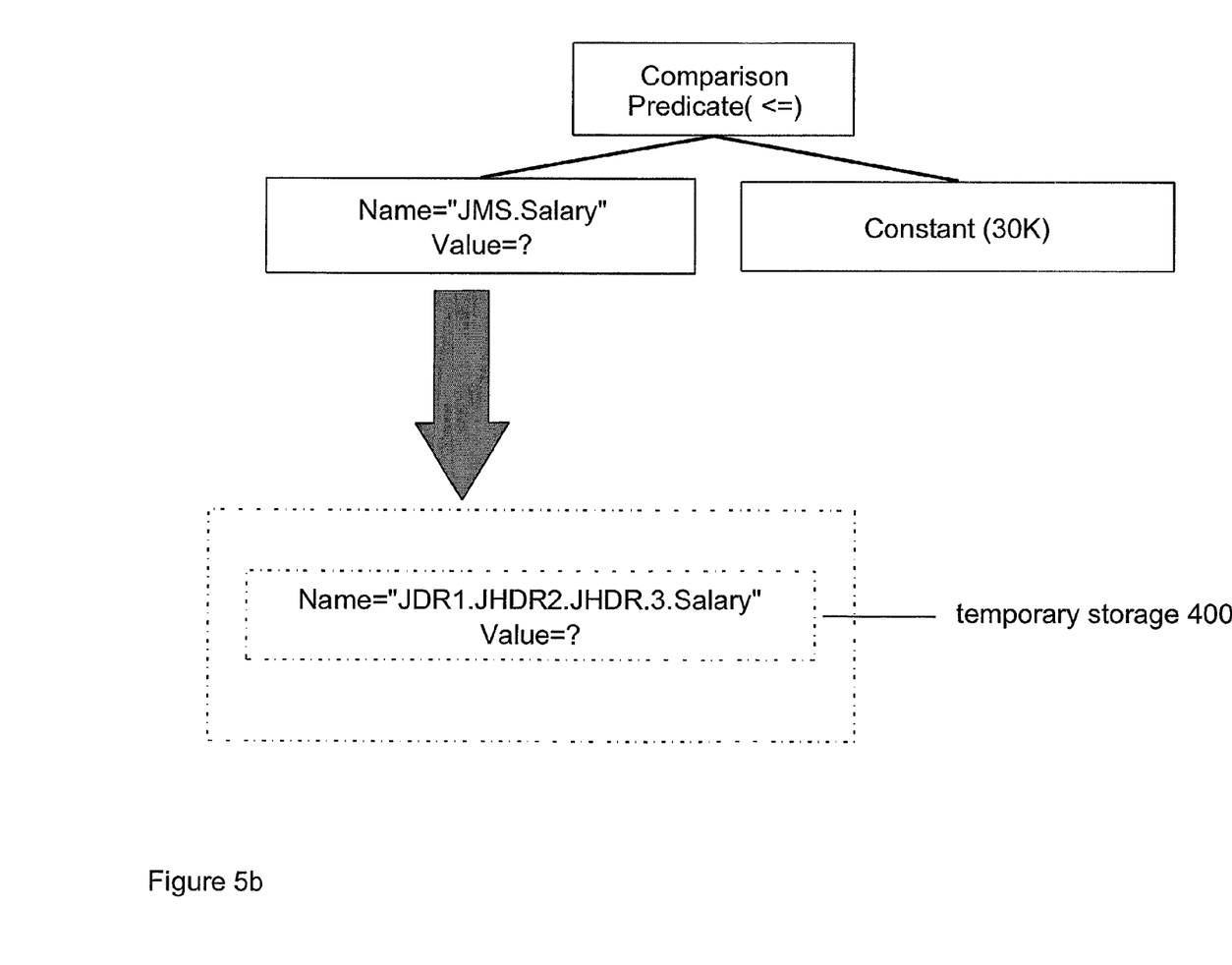

FIGS. 5a and 5b show the processing upon receipt of a publication at the broker in accordance with a preferred embodiment of the present invention. At step 300 at publication of type B is received at the broker (i.e. the salary attribute is located in the 3rd message header). The message is parsed through the previously created tree structure (step 310) until an identifier node of the form JMS.X is detected (step 320). (Note, topic matches will determine which branches of the tree are traversed through to identifier nodes.)

Having detected such an identifier node in the tree-like structure, it is determined what type the publication message is and an appropriate field processor object is invoked (step 330). In this example, a field processor object which understands messages of type B is invoked. Such an object knows where to check for the particular attribute in the publication message. When such an attribute is found, the field processor object maps the generic form of the node into a message type specific form of the node—see FIG. 5b. This specific node is held in temporary storage 400 whilst a comparison is done between the identifier node and the information contained within the publication message (step 350). If the relevant attribute is found in the message, then the value contained therein is input to the identifier node (preferably the original identifier node and not the generic form in temporary storage) and then it is verified whether there are any additional identifier nodes to process (step 360). If there are, the processing returns to step 310. Otherwise processing continues as per normal. In this example, there is only one identifier node. The value input thereto is compared against the constant value shown in FIG. 2 to return either TRUE or FALSE. If a value of TRUE is returned, the message is deemed appropriate for forwarding onto subscribers who have requested such information.

It will of course be appreciated that a subscriber who is using a messaging protocol of type A typically would not automatically be able to understand a publication of type even if the message broker is now able to make the decision that such a publication is appropriate for the subscriber. Thus the publication preferably has to be translated into a format that the subscriber can make sense of.

Figure 6A:
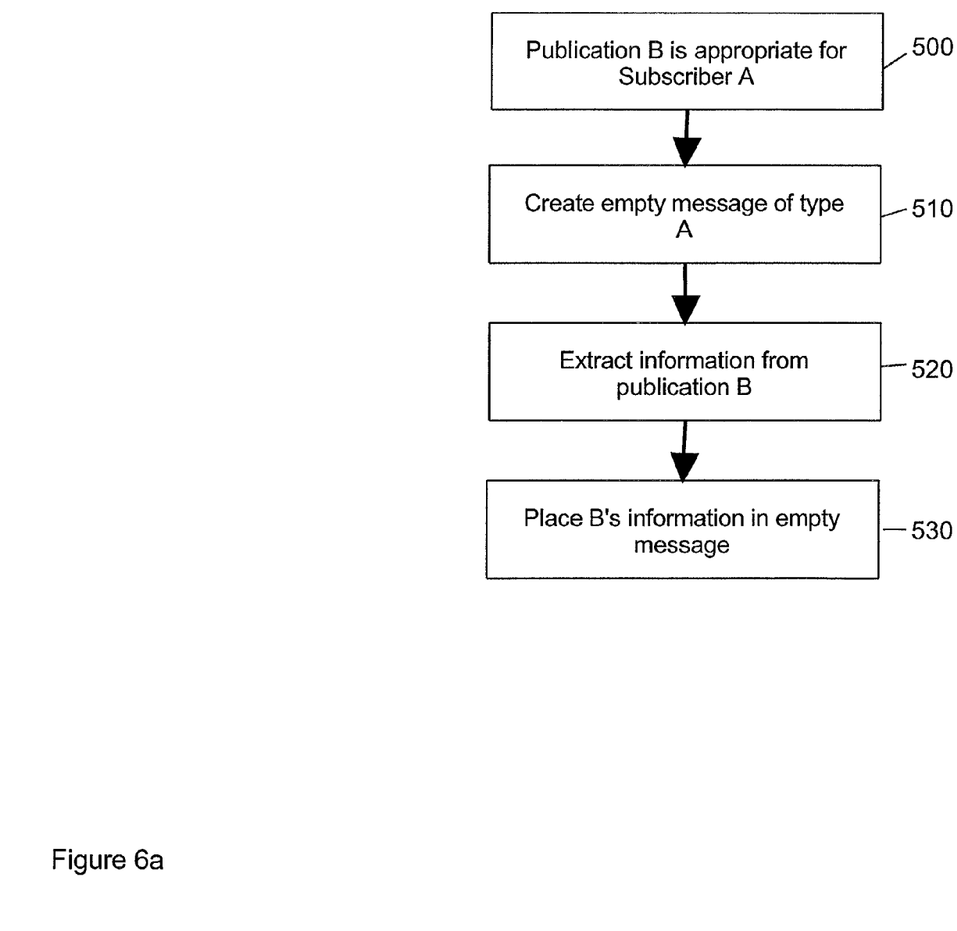
FIGS. 6a and 6b show a message translation process in accordance with a preferred embodiment of the present invention.
Figure 6B:
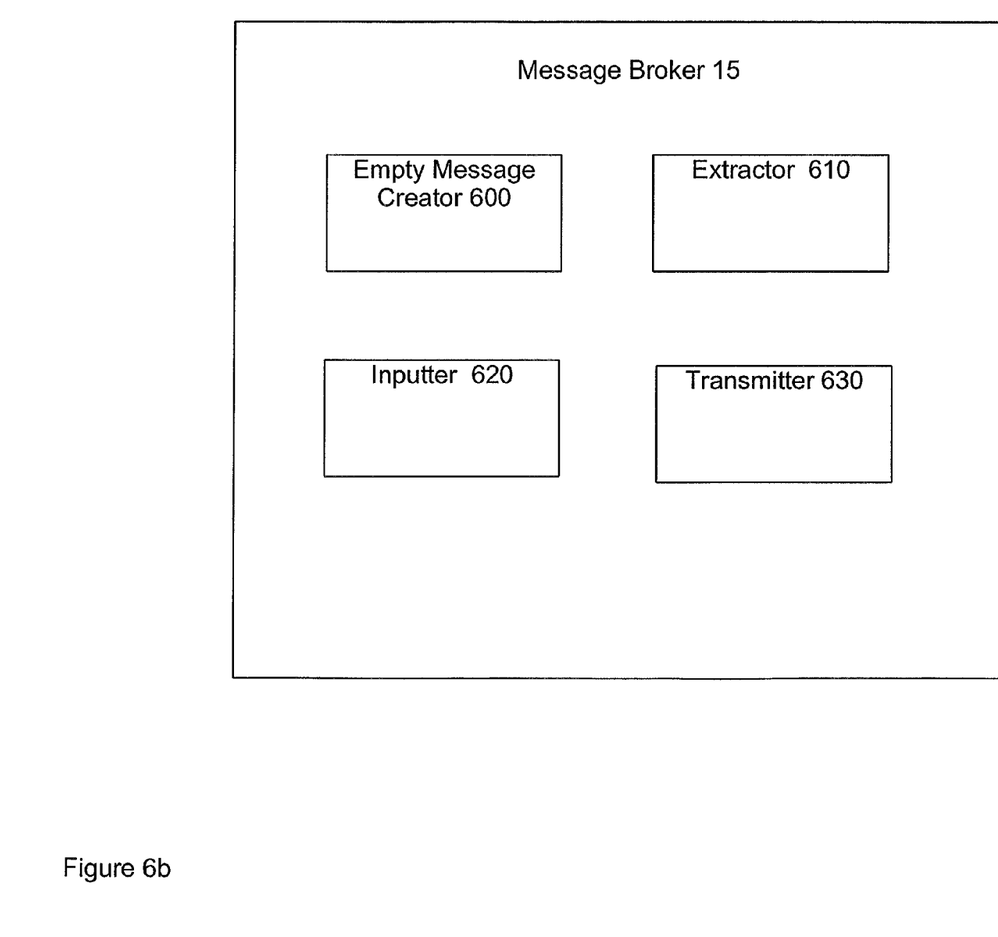

FIGS. 6*a* and 6*b* show the translation process in accordance with a preferred embodiment of the present invention. First it is determined that a publication of, for example, type B is appropriate for a subscriber using, for example, messaging protocol A (step 500). A message creator component 600 within the message broker 15 creates an empty message of type A (step 510).

At step 520 a message extractor component 610, which understands the publication message of type B, extracts message information from the publication. An inputter component 620 inputs this information into the previously created empty message of type A (step 530). A transmitter component 630 sends this message to the appropriate subscriber(s).

Note, there may be separate components 600; 610; and 620 as described above, or one component may do several jobs (e.g. a single component may create an empty message and input the appropriate information into that message.

Further, the message may not be completely empty prior to the inputter component inputting information extracted from the publication message of type B. The creator component 600 may have already filled in parts of the message with information standard to that message type.

What is claimed is:

1. A method for receiving publications and forwarding said publications on to parties who have subscribed to receive such publications, said method comprising:
    receiving a subscription request of a first filter expression format type, said request including a filter expression having at least one attribute;
    mapping at least part of the at least one attribute to a generic format;
    receiving a publication message of a second filter expression format type;
    comparing the publication message received to the subscription request to determine whether to forward the publication message to a subscriber originating the request, the comparing comprising:
        identifying a generic format filter attribute; and
        mapping the generic format filter attribute to a format corresponding to the second filter expression format type, the method further comprising:
    transmitting said publication message to the originating subscriber, wherein
    the first filter expression format type is different than the second filter expression format type.

2. The method of claim 1, further comprising:
    preparing the publication message for transmission to said originating subscriber.

3. The method of claim 2, wherein the preparing the publication message for transmission to said originating subscriber comprises:
    creating a substantially empty message of said first filter expression format type;
    extracting information from the message of said second filter expression format type; and
    inputting said information into said substantially empty message.

4. The method of claim 1, 2 or 3, wherein the mapping at least part of an attribute to a generic format comprises:
    invoking a first component capable of understanding messages of said first filter expression format type.

5. The method of claim 1, 2 or 3, comprising:
    storing said generic format filter attribute.

6. The method of any of claims 1, 2 or 3, wherein the mapping a generic format filter attribute to a format corresponding to the second filter expression format type comprises:
    invoking a second component capable of understanding messages of said second filter expression format type.

7. The method of any of claims 1, 2 or 3, wherein said format corresponding to the second message type is held in temporary storage until said comparison is complete.

\* \* \* \* \*